United States Patent [19]
Olson et al.

[11] Patent Number: 6,115,704
[45] Date of Patent: Sep. 5, 2000

[54] EXTENDED SQL CHANGE DEFINITION LANGUAGE FOR A COMPUTER DATABASE SYSTEM

[75] Inventors: Jack Edward Olson; Linda Carolyn Elliott, both of Austin, Tex.

[73] Assignee: BMC Software, Inc., Sugar Land, Tex.

[21] Appl. No.: 08/239,942

[22] Filed: May 9, 1994

Related U.S. Application Data

[63] Continuation of application No. 07/767,230, Sep. 27, 1991.

[51] Int. Cl.$^7$ .................................................. G06F 15/00
[52] U.S. Cl. ............................................................. 707/3
[58] Field of Search ................................. 395/650, 700

[56] References Cited

U.S. PATENT DOCUMENTS

| | | | |
|---|---|---|---|
| 4,558,413 | 12/1985 | Schmidt et al. | 364/300 |
| 4,939,689 | 7/1990 | Davis et al. | 364/900 |
| 5,197,005 | 3/1993 | Shwartz et al. | 364/419 |

OTHER PUBLICATIONS

Danette Chimenti et al, The LDL System Prototype, Mar. 1990 pp. 76–90, IEEE.
James P. Davis and Ronald D. Bonnell (USC east), Edict—An Enhanced Relational Data Dictionary: Architecture and Example, pp. 184–191, IEEE.
Bryan Pfaffenberger, Ph. D., Que's Computer User's Dictionary, 1992, pp. 568–571.
"Clipper developers convene" by John L. Hawkins, Data Based Advisory Aug. 1989 v7 n8 p. 136(3).
"Data Base Management System For Electrical Engineering Department Administrative Operations" by Bell et al, IEEE Proceedings–1990 Southeastern Session 1B1.
Performances of a Distributed Data Base in Token Ring Network for the Interdepartmental Sharing of the Medical Record, 1988, IEEE Engineering in Medicine & Biology Society.
"An Approach to The Distributed Database Construction" by Zayula et al, IEEE 1991.
"First CL/1 modules give Mac boast up corporate ladder" by John Battello, MacWEEK Dec. 12, 1989 v3 n44 p. 1(2).
"Can CL/1 deliver on Apple's promise of remote access?" by John Battelle, MacWEEK Nov. 14, 1989 v3, n42 p. 39(3).
B. Shneiderman et al, "An Architecture for Automatic Relational Database System Conversion", *ACM Transactions on Database Systems*, vol. 7, No. 2 (Jun. 1982).
J. Kador, "Utility Helps Automate Schema Change Process", *System Development*, vol. 9, No.1 (Jan. 1989).
Thomas et al, "Automatic Database System Conversion: A Transformation Language Approach to Sub–Schema Implementation", Compsac 80 4th International Computer Software & Application Conference 27 (Oct. 1980) (Chicago).
D. Haderle et al, "IBM Database 2 Overview", *IBM Systems Journal*, vol. 23, No. 2, (1984).
Elmasri et al, "Fundamentals of Database Systems", Part VI, Commercial Database Systems, Ch. 23, Sec. 23.1, A Relational Database System–DB2, pp. 663–683, 727, 757, 1989.
IBM, "IBM Database 2 Version 2, SQL Reference, Release 2", Second Edition, Sep. 1989, pp. 100–121, (order No. 5C26–4380–1).

*Primary Examiner*—Anton W. Fetting
*Attorney, Agent, or Firm*—Howrey Simon; Arnold & White LLP

[57] ABSTRACT

A change definition language (CDL) serves as an extension of (and in the general format of) the structured query language known as SQL. The change definition language allows all important alterations to be described, as changes to an existing definition, for example, and may be used by all phases of the development cycle. The CDL statements do not make the changes directly in the catalog, but instead work through SQL and another intermediate mechanism such as DB2 ALTER tailored to make changes using SQL. The changes expressed in CDL may be migrated to downstream phases and fed back to earlier phases by use of a batch of change statements expressed in CDL.

2 Claims, 10 Drawing Sheets

EXTENDED SQL CHANGE DEFINITION LANGUAGE FOR A COMPUTER DATABASE SYSTEM

This application is a continuation of application Ser. No. 07/767,230, filed Sep. 27, 1991, entitled CHANGE DEFINITION LANGUAGE FOR COMPUTER DATABASE SYSTEM.

BACKGROUND OF INVENTION

This invention relates to computer database systems, and more particularly to a language for a method of making changes to a definition of a relational database system.

A database system operating in an environment such as that provided by IBM's DATABASE 2 (DB2) computer software system commonly takes the form of a relational database product which appears to a user as a set of user-defined tables. A table is a set of columns and rows, where each column has a user-selected name and datatype, and each row is a record of data values entered for the columns. This type of database product, when fully developed and operating on a computer, includes a catalog (or dictionary) which defines these tables, as well as indexes and views of the tables, and relationships between them, plus the data itself entered by users. A structured query language, referred to as SQL, is employed to access the data, and is also used to define the form of the database, i.e., describe the tables, and describe indexes and views of the tables and other objects of the database. This structured query language is a high level programming language specifically designed for the database product, and permits a user to access or define elements without resort to a lower-level language or assembly. The statements of SQL are limited, however, and so other programming tools and languages are used, particularly in design and development phases of application definition.

After such a database system has been initially developed (e.g., by a DB2 customer's in-house programmers), the system is frequently subjected to an on-going series of changes as it is upgraded, debugged, expanded, etc. A commercially-available product useful for generating these changes is a product called "DB2 ALTER," sold by BMC Software, Inc., the assignee of this invention; this product functions to allow a user to describe changes in an interactive way (at a terminal), then these changes are implemented by using SQL to make changes in the database definition itself. Generally, a product such as DB2 ALTER effects changes by producing a sequence of operations expressed in SQL and other functional languages for unloading a database, wiping out (dropping) a part of the catalog, rebuilding a new part of the catalog to replace that which was dropped, then restructuring the data according to the revised catalog. Commercially available products providing features analogous to DB2 ALTER include RC MIGRATE, by Platinum Technology of Lombard, Ill., PROALTER PLUS by On-Line Software of Fort Lee, N.J., TRANSRELATE by Compuware, and a product made by Goal Systems International of Columbus, Ohio.

A database system for a particular application may be created and debugged by separate teams of programmers in a large organization, and these teams may use incompatible tools. A design team makes an initial design, often employing a computer-aided software engineering (CASE) tool, (for example, a commercially-available Bachman tool) and the database definition is passed on in the form of a set of SQL statements to a development team which has the responsibility of generating a production version of the database. The development team, in changing the definition for more fully tailoring the application to the customer's intent, may employ a different tool, such as DB2 ALTER, or another programming language, for its own efficiency or convenience. The developers may then turn the revised version of the database over to a testing facility, where testing and debugging result in additional changes; these changes may be implemented again in DB2 ALTER. Finally, the database is released to production use, and the team which maintains the software for the production operation may make performance-enhancing changes in the way the data is physically stored, and other changes as a result of factors discovered by day-to-day users entering data or evaluating reports generated by the database system. Meanwhile, the design team is generating updated versions of the system, adding features and incorporating changes as a result of changes in the business, hardware additions, etc., and these updated versions pass through the same series of phases—development, test and production. The downstream phases must employ the updated, revised version of the system, but yet will want to keep the revisions they have made in the previous version. All of the changes made at any phase must therefore be migrated forward to downstream users, and often also fed back to earlier phases, and this must be done in an efficient manner.

Since the design and development people are often using design tools and languages in generating the database definition, which may be different from that of the production-level programmers, and the definition and changes must be implemented in a specific mechanism such as SQL for IBM DB2, a problem has existed in passing changes from design and development to production, and integrating production-level changes into a design and development environment. Only by extensive hand-entry of change lists, and comparisons of lengthy descriptions, have these types of interaction been achievable.

SUMMARY OF THE INVENTION

In accordance with one embodiment of the invention, a database application implemented on a computer includes a generic database management product (software) along with a catalog defining the way the data itself is stored. In a particular embodiment, the database system operates in the IBM DB2 environment. The catalog is a definition of the tables, indexes, views, user authorizations, etc., that specify a user's particular application of the database management system. Access to the database via the catalog uses a structured query language. A structured query language (SQL) provides a way of expressing statements in a high-level language so the user will not be burdened with writing code to access the data itself. The structured query language provides statements for defining tables, indexes, views, etc., to be incorporated into the catalog. A database application (to fit a user's business) is generated and updated in a number of phases, such as design, development, test and production, and in each one of these phases a facility exists for making alterations in the database definition (catalog), all of which make use of SQL to implement the changes. According to a feature of the invention, a change definition language (CDL) is provided which is an extension of (and in the general format of) the structured query language. The change definition language allows all important alterations to be described, as changes to an existing definition, for example, and may be used by all phases of the development cycle. The CDL statements do not make the changes directly in the catalog, but instead work through SQL and another intermediate mechanism such as DB2 ALTER tailored to make changes using SQL. The changes expressed in CDL may be migrated to downstream phases and fed back to earlier phases by use of a batch of change statements expressed in CDL.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

DETAILED DESCRIPTION OF SPECIFIC EMBODIMENT

Relational Database System

Figure 1:
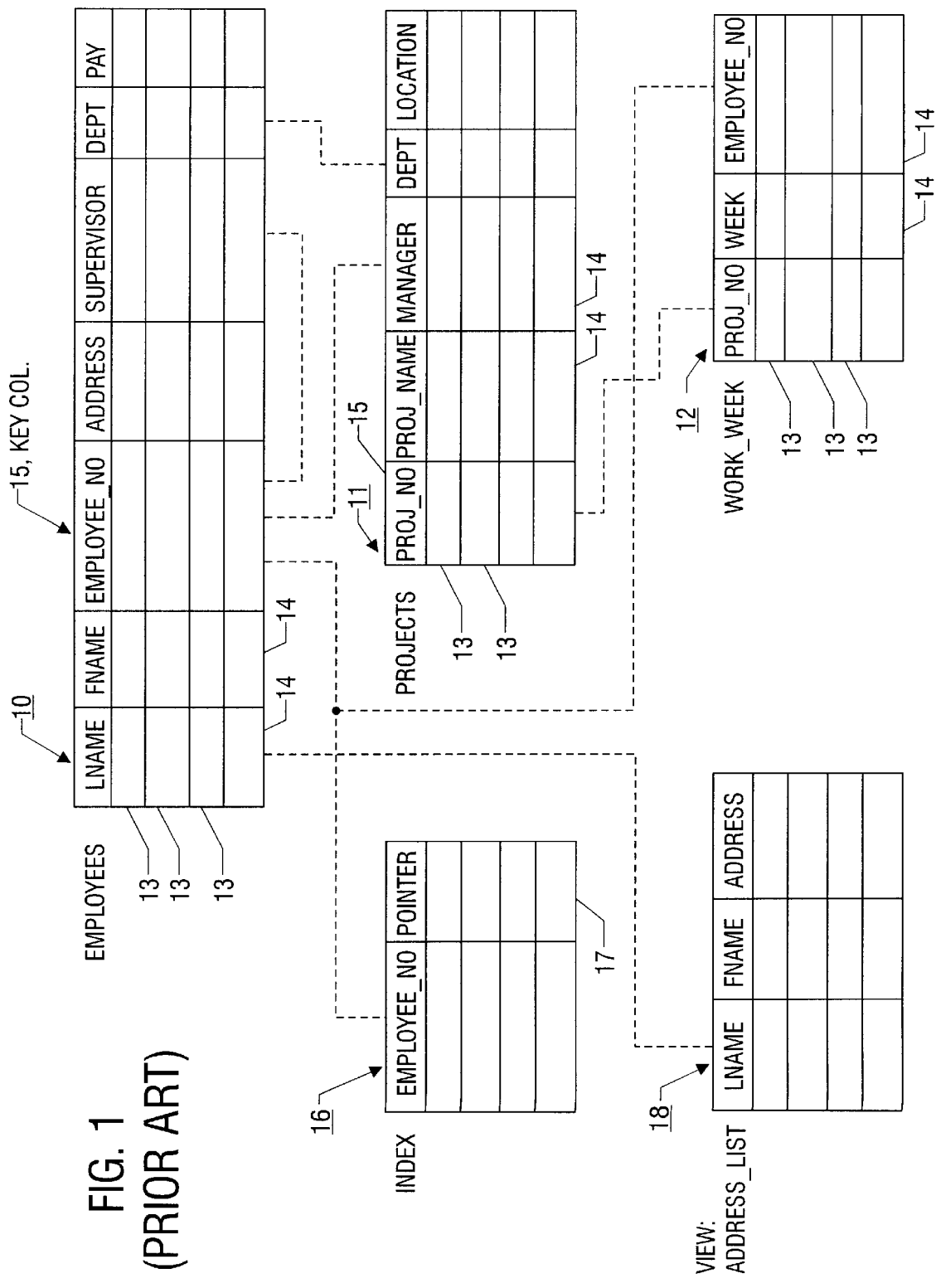
FIG. 1 is a diagram of tables, indexes and views in a simplified example of a database.

A relational database product is a software database that appears to the user as if it were a number of tables, such as the tables 10, 11 and 12 of FIG. 1, with each table including a field that is also used in another table (i.e., "related" to another table). A table 10 has rows 13 and columns 14, where each row is a "record" and each column is a "field" of this record, so all records in a table have the same fields or columns. There can be an arbitrary number of records (rows) in a table within the constraints of available storage space, and usually the rows are in the order that the data is entered rather than in some ordered sequence. In this simplified example database of FIG. 1 the purpose is to keep track of employees and work projects for a small company, and the table 10 has the name "Employees" and contains columns for first name, last name, employee number, address, etc. The table 11 is called "Projects" and has columns 14 for Project Number, Manager (identified by employee number), Department, and Location. The table 12 is called Work_Week and for each employee records what project number he worked on in the week ending on the date indicated in the Week column. In a relational database a table may have a key field 15 (sometimes specified as it must be unique to a record, i.e., no two records in table 10 can have the same value for this key field 15). In this example, the employee number column is the key field 15 in table 10, and project number can be a key field in table 11. An employee number will appear more than once in the table 12, indeed once every week, so the Employee_No column cannot be a key column if specified as a unique key column. In table 11, the Project_No column is a key field, and in this table each project number should be used only once.

In order to speed up the task of finding a given record, it is possible to create indexes of the data in the tables, so if the tables are spread over a large number of pages in the storage system, the value being sought can be found without searching through the entire mass of data without direction. For example, an index 16 as seen in FIG. 1 contains only the employee number (from table 10) and a pointer 17 to the actual physical page number where this record is stored. Thus, to retrieve a record for a specified employee, it is merely necessary to retrieve the index 16, then retrieve the page pointed to by the pointer 17, rather than blindly retrieving all that pages containing the data of the table 10 and searching for the specified employee. Tables such as the table 16 can be created for other columns, such as last names, SSNs, etc., as may be useful.

Another characteristic of this type of relational database product is a "view." A view is an alternative way of looking at the data in one or more tables. An example of a view 18 called Address_List is shown in FIG. 1, where the last name, first name and address columns from table 10 are extracted and appear as columns of the view. Thus, a view has rows and columns just as a table, but a table is physically stored as such, while a view is not. A view is generated from the data of the stored table when its use is invoked. A view may be used to control access to a table; access to a view can be granted without granting access to the table itself, so the view shows only portions of the data in the table, screening out sensitive data, e.g., the pay column, etc. Or a view can be used to combine data from two or more tables.

Of course, the example of FIG. 1 is grossly simplified; a typical implementation of a database such as DB2 on a large mainframe may have many thousands of tables, indexes and views, and the number of records (rows) in some tables may be in the hundreds of thousands or millions. Generally, the database products of interest here include those capable of maintaining the largest of database applications, such as nationally-based credit card accounting and verification systems, or the like.

Figure 2:
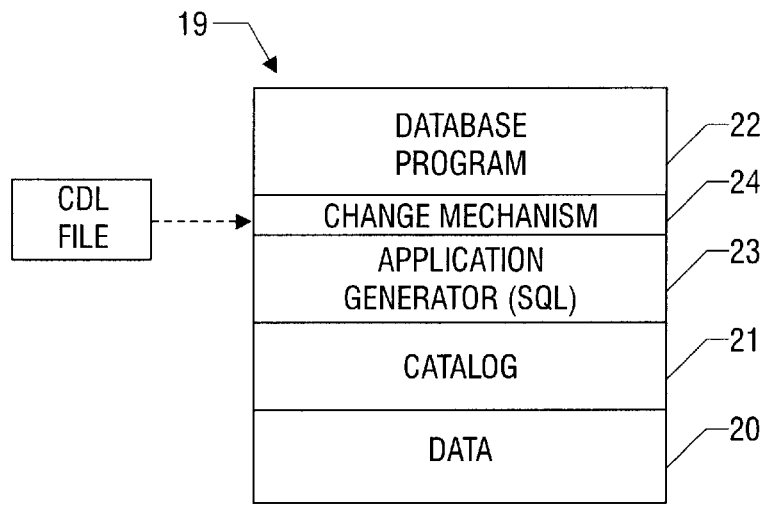
FIG. 2 is a map of memory containing a database system such as would include the application example of FIG. 1.

Referring to FIG. 2, a database system is thus stored in storage 19 as a block of data 20 which includes the actual values in the rows 13 of all the tables, plus the values in all of entries in the indexes 16. This data 20 is stored in physical storage in pages, partitioned in ways that are important from a performance standpoint. In addition, a catalog 21 is stored which is the definition of all of the tables (name of table, name of columns, specification of data types in columns), a definition of all of the indexes (name, columns, pointers), a definition of all of the views, and the other objects of the system, all this itself being in the form of a set of tables. That is, in the catalog 21 there is standardized set of tables, including a table of tables, a table of columns, a table of indexes, and a table of views, etc., as discussed below. Thus, to create or to change a database definition, the standard tables of the catalog are filled in and updated. Also stored in memory as illustrated in FIG. 2 is the database program 22 itself (e.g., IBM DB2), which defines how the catalog 21 is set up and how the data 20 is accessed using the catalog. As part of the database program 22, or as a separate module, there is a mechanism for controlling user access to the database and catalog for both defining the database and then for accessing it, referred to herein as a structured query language or SQL, in a block 23 of FIG. 2. As will be later described, an additional module 24 may be included, according to the invention, to provide a change mechanism (using as input a set of statements in a change definition language) to be used along with the SQL module 23 to make changes in the catalog 21 and thus alter the database definition.

Figure 3:
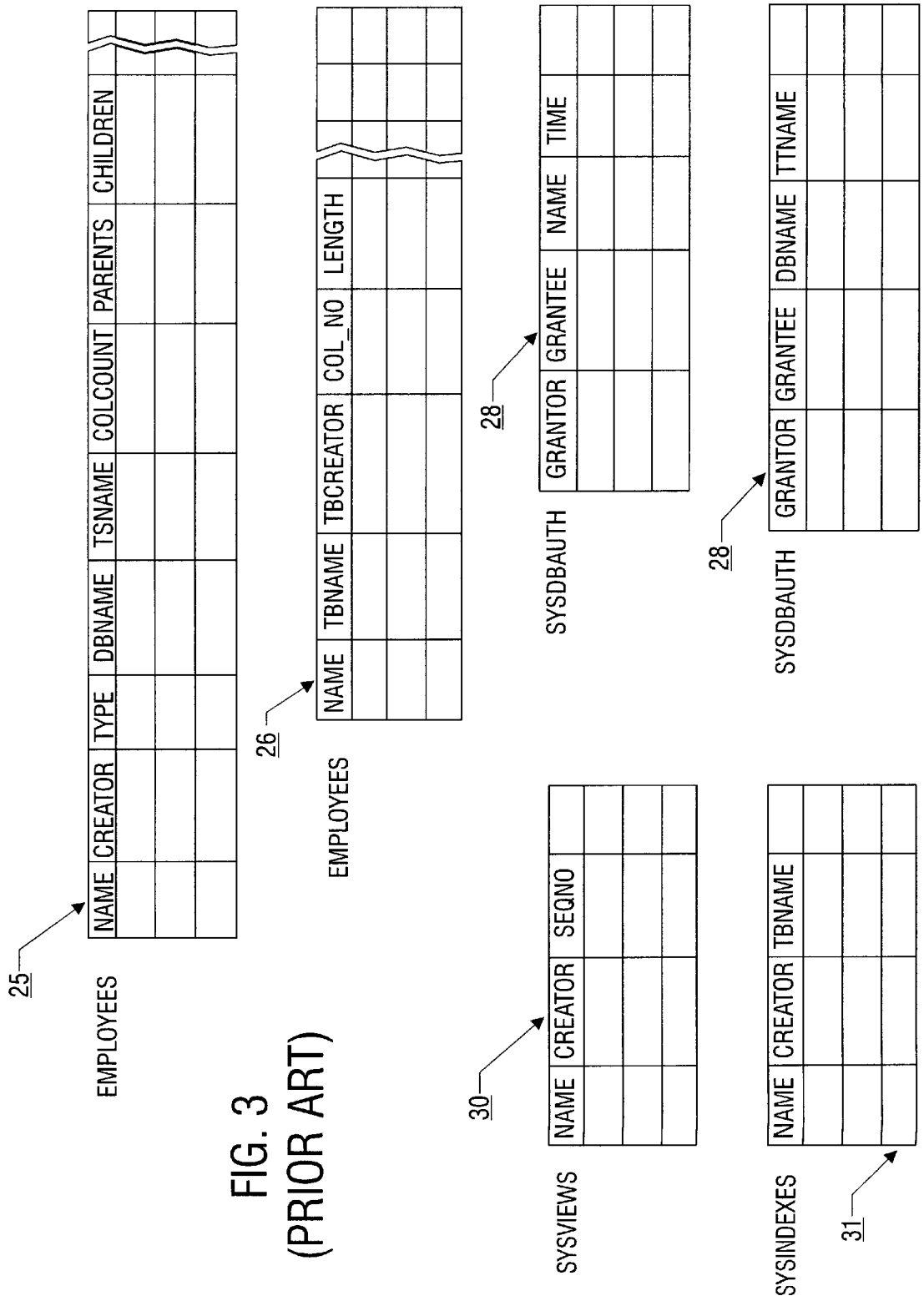
FIG. 3 is a diagram of tables in the catalog of a DB2 database for a database application.

Referring to FIG. 3, when operating with the IBM DB2 product as referred to herein, a SYSTABLES table 25 in the catalog 21 contains one row for each table, view or alias, and the columns in this table 25 include the name (NAME) of the table, view or alias, the authorization ID (CREATOR) of the owner of the table, view or alias, the type of object (TYPE) as a table, view or alias, the database name (DBNAME), the tablespace name (TSNAME), the number of columns in a table or view (COLCOUNT), the number of relationships (e.g., tables) in which the table is dependent (PARENTS), the number of relationships in which the table is a parent (CHILDREN), and various other columns as set forth in the detailed specification of the product. A SYSCOLUMNS table 26 in the catalog 21 is another of the principal tables, set up by the database program 22 to record the columns used in any of the tables or views; this records (in columns) the name of the column (NAME), the name of the table or view containing the column (TBNAME), the authorization ID (TBCREATOR) of the owner of the table or view that contains the column, the column number or numerical place (COLNO) in the table or view, the datatype of the column (LENGTH), and various other columns as set forth in the detailed specification. Another table 27 referred to as the SYSDATABASE TABLE in DB2 contains one row for each database set up by the present instance of the DBMS, and records the name and creator in columns, as well as the storage group and bufferpool which are related to physical storage and retrieval, as will be described. Another pair of important tables are the SYSDBAUTH table 28 and the SYSTABAUTH table 29, which record the grantor and grantee for any privileges granted, the database or table name for which granted, the time and date, and details of what privilege was granted. A SYSINDEXES table 30 and a SYSVIEWS table 31 record the indexes and views record the values apparent from FIG. 3 for indexes and views. Other tables are included in the catalog as explained in the DB2 product specifications. The change mechanism 24 of FIG. 2 is for the purpose of generating statements for changing the set of catalog tables such as that of FIG. 3, using as an intermediary a data definition language of the SQL module 23.

Figure 4:
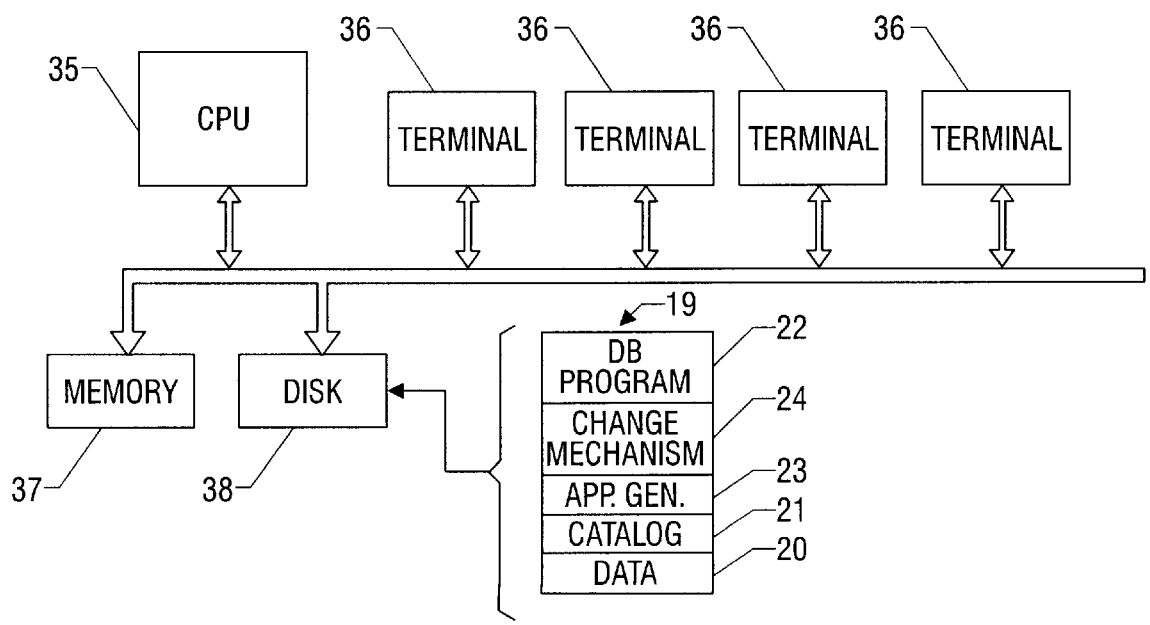
FIG. 4 is a diagram of a computer system which may be used for implementing a database management system such as that of FIGS. 1 and 2.

A database product (e.g., a database program 22) is created and sold to customers as a generic product, a DBMS or database management system, useful for an unlimited number of different applications. The customer then builds a customized database to fit its particular business by creating the tables, indexes and views, defined in the catalog 21, using the SQL. Referring to FIG. 4, the customer may be running a computer system having a CPU 35 and a number of terminals 36, with memory 37 and disk storage 38, as an example. The database system used by the customer includes the purchased database product 22 (e.g., DB2) which is the generic software, along with an applications generator product 23, such as SQL or structured query language as will be described, used to produce a customized definition of how the database is to be utilized locally, i.e., define the tables of FIG. 1 using the catalog tables of FIG. 3. This customized definition is usually created by first writing a description in a high-level language (other than SQL) using a CASE tool to generate a file of SQL statements, then using the database program 22 to interpret the SQL statements and thus generate the catalog 21 itself. The actual data to be recorded and manipulated is stored in the data file 20, which is raw data in a format described in the catalog 21.

Figure 5:
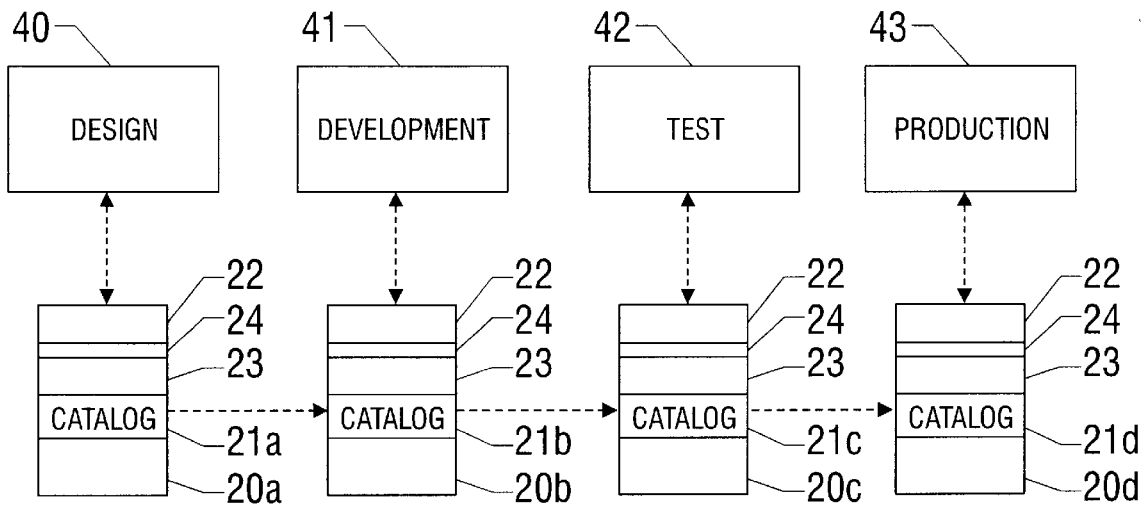
FIG. 5 is a diagram of a design, development, test and production cycle of a database application.

The development cycle of a database application such as that of FIGS. 1–4 is illustrated in FIG. 5. The database "schema" or layout as to be defined in the catalog 21 is generated by a designer in design phase 40; the designer is skilled in systems analysis and in the programming languages used, e.g. the applications generator or SQL 23 or other language(s) used, and would usually be somewhat removed from the actual production use of the product in its final form in the field. For example, the designer need not be concerned with performance tuning factors, which are dependent upon the hardware configuration; indeed, this tuning may differ in various locations where the ultimate database application is used. The design created in the design phase 40 would be an instance of the database of FIG. 2, shown in FIG. 5 as a catalog 21a, and perhaps a stub or test version of the data 20a itself may be included, but this is not necessarily the real-world data to be eventually entered. A copy 22a of the database software 22 is available in the design phase, of course, and, if appropriate, a copy 23a of the applications-generator language, e.g., SQL, but often the designers use other tools for defining the application. According to the invention, as will be described below, the change mechanism 24 may be present in the representation of FIG. 5, but the design-development sequence is described in general first. The database as defined by the designers (composed principally of the catalog 21a) is then transmitted to the development phase 41, where there are applications developers who are skilled programmers familiar with the applications programming language 23 (or other tool for defining the database) and in the customer's requirements in using the system. These people expand the definition in catalog 21a and recompile it to obtain the more complete definition in catalog 21b. As before, the data 20b is not yet necessarily the customer's real data as will ultimately be used, but is of the same format. The application then goes to the test phase 42, where all aspects are tested by a number of skilled users; this is a debugging phase, sometimes referred to a beta test. After the testing phase, when the application is deemed to be ready for release, it appears as another instance 21c of the catalog, and this goes to a production phase 43. There may be a number of different instances of the production phase 43, at different physical locations. Here, the data 20 of the database as described above is generated in complete and real-world form, and continuously updated on a day-to-day basis. In production, the database is used on-line by the ultimate users, which include the naive users who merely enter data, as well as skilled programmers who are maintaining the application, making corrections related to day-to-day problems surfacing from use on the line, and performance-tuning to achieve optimum speed and ease-of-use. After a period of use, the database is thus defined by another instance 21d of the catalog, reflecting changes made due to problems encountered or new knowledge gained in production use.

Thus, at each of these stages, the design phase 40, the applications phase 41, the test phase 42 and the production phase 43, a complete set of the components of the application exist. That is, the generic database software 22, the applications development language 23, the dictionary or catalog 21 and the database data file 20 (in some test form, at least) all exist, and the skilled workers at each stage may make changes in the definition of the database application as it is expressed in the catalog module 21. A separate version 21a, 21b, 21c and 21d of the definition dictionary or catalog 21 is maintained at each stage 40,41, 42 and 43, so that a stable version is available for use at each phase. During the initial creation of the application, and during the life of the application, many changes may be made at each stage. The designers at stage 40 will continue to upgrade the application to add new features and capabilities, the developers at stage 41 will continue to implement the updated design received from the design phase and make changes as needed, the test stage 42 will make changes dictated by testing, and the production phase 43 (or multiple instances of production phase) will continue to make changes required by day-to-day problems and varying working conditions. The designers working on updates need to take into account problems found in testing or production. It is thus desired that the changes made at any stage be migrated to succeeding stages, as well as fed back to previous stages. That is, after the initial design has been passed downstream, it is not a desirable solution to merely pass along to downstream stages a revised and updated version of the application catalog 21, e.g., a catalog 21b from development phase 41 to test phase 42, because the test phase 42 will have implemented their own changes to produce an instance 21c, including changes that have not been fed back to the development phase, so these would be lost if instance 21b were adopted.

The problem of making changes in the database definition and updating all instances of the database is compounded by the fact that the original definition in the design phase 40 (and perhaps development phase 41 as well) may be done using a high-level language other than the application definition language 23 (SQL for DB2). For example, a CASE (computer aided software engineering) tool may be used by the designers in phase 40 to generate the definition of the tables of FIG. 1 for the catalog 21, and this CASE tool generates a set of SQL statements for passing along to downstream phases. Subsequent changes made downstream in the development cycle, e.g., in the production phase, will be made in SQL, i.e., the built-in applications-generator language 23. These changes are not likely to be readily combinable. The SQL changes from downstream are not capable of incorporation into the CASE language definition generated in the design phase. More importantly, the downstream instances of the catalog 21 are no longer the same, after a time period where local changes have been made, and even if a list of changes is passed downstream for hand entry, the then existing local catalog 21 may not be compatible with the changes requested by the list.

According to the invention, a change definition language (used for an input CDL file for the change mechanism module 24 of FIG. 5) is provided, and this language may be used by all phases of the development and production cycle. This language makes use of the data definition language of SQL, and is indeed in a format very similar to SQL statements. Unlike SQL, however, the change definition language provides a full capability of defining and making changes in all objects of the catalog 21. As will appear, SQL alone was not suitable for describing some of the most important operations.

Some characteristics of SQL and DB2 will first be described, then the change definition language will be described in more detail.

Structured Query Language

The structured query language that is a part of DB2 has two major components, these being the DDL or data definition language and the DML or data manipulation language. The DDL is used for creating the database description or catalog, and for making changes in the catalog after it exists; the DDL does no actually make changes in parts of the catalog, but instead "drops" or cancels an object and rebuilds it.

The tables are created in SQL by a CREATE TABLE statement, which is of the structure defined exactly in the referenced publications, but is generally of the form illustrated in the following example for creating the Employees table 10 of FIG. 1:

```
CREATE TABLE EMPLOYEES
    ( FNAME          datatype        NOT NULL,
      LNAME          datatype        NOT NULL,
      EMPLOYEE_NO    datatype        NOT NULL,
      ADDRESS        datatype,
      SUPERVISOR     datatype,
      DEPT           datatype,
      PAY            datatype,
      SSN            datatype        NOT NULL )
``` where the "datatype" is a specification of the type of data that must be entered here, e.g., a string of alphanumeric characters of specified length, a floating point numerical value of specified length, a date, etc. The NOT NULL statement means a value must be entered for this column.

A view in SQL, as discussed above in reference to FIG. 1, is a single table that is derived from other tables or from other views. A view usually does not exist in physical form in the data 20, but is a virtual table instead of one that is actually stored in the database. This limits the possible update operations that can be applied to a view. A view is a way of specifying a table that is to be referenced frequently, even though it may not physically exist. For example, from the tables of FIG. 1, it may be desired to retrieve the names of employees working on a project, so a statement is employed:

```
CREATE VIEW PROJECT-WEEK
    AS SELECT    FNAME, LNAME, PROJ_NAME
        FROM     EMPLOYEES,PROJECTS
```

When a view is not needed any more, a DROP VIEW command is used to dispose of it:

```
DROP VIEW PROJECT_WEEK
```

Views can be updated by an UPDATE command, which actually updates the values in the data 20 in the underlying tables from which the view is created.

An important part of a relational database is the index. An index is an access structure or path that is specified on one or more columns of a table, making accessing rows more efficient. Executing a query will take less time if some attributes involved in the query conditions were indexed; the effect is noticeable if the number of rows is quite large. The command to generate an index of the last name column for employees from the Employees table of FIG. 1 is:

```
        CREATE INDEX LAST_NAMES
          ON EMPLOYEES (LNAME)
```

The actual index would have for each employee last name a pointer to the row in the Employees table for this instance. Transparent to the user, the pointer specifies the page in the virtual memory system where this row is physically located, so it is not necessary to retrieve all pages from disk to search for a particular employee. There is a time saving in execution, of course, only if there are a large number of pages needed to contain the Employees table, i.e., a large number of employees. If the table was contained on one or two pages of memory, then the recovery time would be increased instead of decreased by using a table, because it would be necessary to first recover the index itself, then retrieve the page based on the pointer found in the index. If the number of pages of employees is large, however, creating indexes on often-used reference attributes such as last name, employee number, or SSN provides a noticeable performance improvement.

It is necessary to provide security and access privileges in some manner, and SQL does this with GRANT and REVOKE statements. Some users may be prohibited from accessing certain data, typically salary data, for example, in the Employees table of FIG. 1. Some commands are allowed to be executed only by certain classes of users. A naive user, entering data or transactions at a terminal, may have access to no SQL commands at all, but instead uses the database only by means of applications programs written by the designers. A database manager may need to have access to all data and certain SQL commands, but not all, whereas a systems administrator may need a different set of access rights. A system designer of course needs access to all commands. To this end, a DBMS has an authorization subsystem which enforces these restrictions. User accounts are created, and a person needing access to a database must have an account, with account number and password, and a user must login using valid account number and password, administered by the authorization subsystem, under control of a privileged user such as the systems administrator. The systems administrator can issue a command

```
          GRANT CREATETAB
             TO Acct1
``` which grants to the user having account number Acct1 the right to create tables (CREATETAB), i.e., to execute the CREATE TABLE command. This also grants to user Acct1 the ownership of the tables created, and the right to say who has rights to use the tables. Then this user issues commands to create the tables of FIG. 1, and also issues the command

```
        GRANT INSERT,DELETE
           ON EMPLOYEES
              TO Acct2
``` which gives the user Acct2 the right to insert and delete rows in the Employees table. Only if a clause WITH GRANT OPTION is added can the user Acct2 propagate the right to other users.

A relational database system relies on key values to constrain the relationship between information in related tables. When a column is designated a key value, then its value must be unique; no two rows can have the same value for a key column. For example, in FIG. 1, the employee number would be a key, so no two employees can have the same number. The create index command is used to designate a column as a key, as follows:

```
    CREATE UNIQUE INDEX   EMPLOYEE_NO_INDEX
         ON EMPLOYEES (EMPLOYEE_NO)
``` which generates an index called Employee_No_Index that requires each employee number to be unique. The department numbers and SSNs can be likewise declared unique, so there can be no duplications.

The SQL language is a special-purpose high-level programming language that frees the database user from working with the actual physical data structures used in the database. The commands generated by the user of SQL may be employed interactively (in real time) at a terminal, or for "canned" inquires or transactions that are compiled by the SQL module or a compiler to generate code for defining the data structures for storage and retrieval. SQL statements can be used in conjunction with a general-purpose high-level programming language such as C, Pascal, Cobol or PL/I, for example, or with assembly language, in which case the other programming language is the host language. An SQL statement, e.g., a data definition, query, update, view definition, or index creation, can be embedded in a host language program, using some specified designator to separate the SQL statements from the host language code. For example, in PL/I the keywords EXEC SQL precede an embedded SQL statement. In some cases SQL statements can be passed as parameters in procedure calls. The names given to columns and tables are then declared as variables in the host language, and the actual physical data of the database manipulated in this way.

When a table, index or view is created using the SQL statements discussed above, the tables of FIG. 3 in the catalog 21 are changed to reflect the appropriate information.

The other part of SQL, as mentioned above, is the DML or data manipulation language, used for entering data and accessing the data in the database data section 20. The DML is not used in connection with the CDL of the invention. A DBMS using SQL has one basic statement in DML for retrieving data from a database, and that is the SELECT statement. The exact format of this statement is given in the referenced publications for IBM DB2. However, in general, a SELECT statement specifies the table from which the data is to be recovered, the columns to be recovered, and the conditions, a Boolean expression that identifies the rows to be retrieved. For example, the statement:

```
        SELECT ADDRESS
           FROM EMPLOYEES
        WHERE FNAME = JOHN AND LNAME = SMITH
``` selects the address column from the table 10 called Employees in FIG. 1, for the row having first name John and last name Smith. In a similar manner, the statement:

```
            SELECT *
              FROM EMPLOYEES
                WHERE SUPERVISOR = 045
``` selects a list of all columns for the Employees table 10 having a supervisor whose employee number is "045." SELECT statements can be nested, such as:

```
     SELECT LNAME, FNAME
       FROM EMPLOYEES
         WHERE ( SELECT PROJECT_NO
                   FROM PROJECTS
                     WHERE MANAGER_NO = 073 )
``` selects last name and first name columns from the Employee table for employees having a Project No. where the project manager (selected from the Projects table) has an Employee No.=073.

The DML part of SQL includes three commands for modifying (entering data into) a database, these being INSERT, DELETE and UPDATE. In simple form, INSERT is used to add a row to a table, and is of the general form:

```
    INSERT INTO EMPLOYEES
       VALUES    ("James", "Brown", "092", "125 Maple St.
                  Houston TX 77039", "053", "007",
                  "12.75", "754-75-7566")
``` which would insert values for all columns of a new row in the Employees table of FIG. 1. If only some but not all of the values are known, the insert would be of the form:

```
       INSERT INTO EMPLOYEES (FNAME,LNAME,SSN)
          VALUES ("James","Brown","754-75-7566")
```

The delete statement is of a form very similar to the insert statement, but deletes a row or rows from a table:

```
              DELETE FROM EMPLOYEES
                 WHERE LNAME = "Brown"
``` would delete all rows having a employee's last name "Brown." The update command is used to modify column values of one or more selected rows, where a SET clause specifies the column or columns to be modified and their new values:

```
                UPDATE EMPLOYEES
                   SET ADDRESS = "321 Westview"
                     WHERE EMPLOYEE_NO = 093
```

Database 2 (IBM DB2)

The database management system (DBMS) product for which the change definition language of one embodiment of the invention was specifically designed is DB2 or Database 2, a commercially available product of IBM Corporation, for use with the MVS operating system. Database 2 or DB2 is described in a number of publications of the IBM Corporation, particularly the so-called "IBM Database 2 Version 2 Release 2 Library" which is a collection of ten books including titles such as "Application Programming and SQL Guide, SC26-4377-1." The DB2 database product is a relational database environment, and a specific implementation of the query language (discussed in general above) called SQL or Structured Query Language is used to access data in the DB2 database product using DML, and to create or alter a database definition using DDL. The principle of SQL here, as in other implementations of SQL, is that a single statement directed to DB2 may be used to select, create, or otherwise operate on the data, rather than requiring a user to code a sequence of instructions explaining how to access the data. SQL provides full definition and data manipulation capabilities which can be used to define objects such as tables, indexes, views, etc., (there are eleven principal objects) as well as retrieving, inserting, updating, deleting data, and controlling access authorization to data. The eleven principal objects in DB2 are database, table, view, index, storage group, tablespace, synonym, alias, authorization, plan and foreign key.

Figure 6:
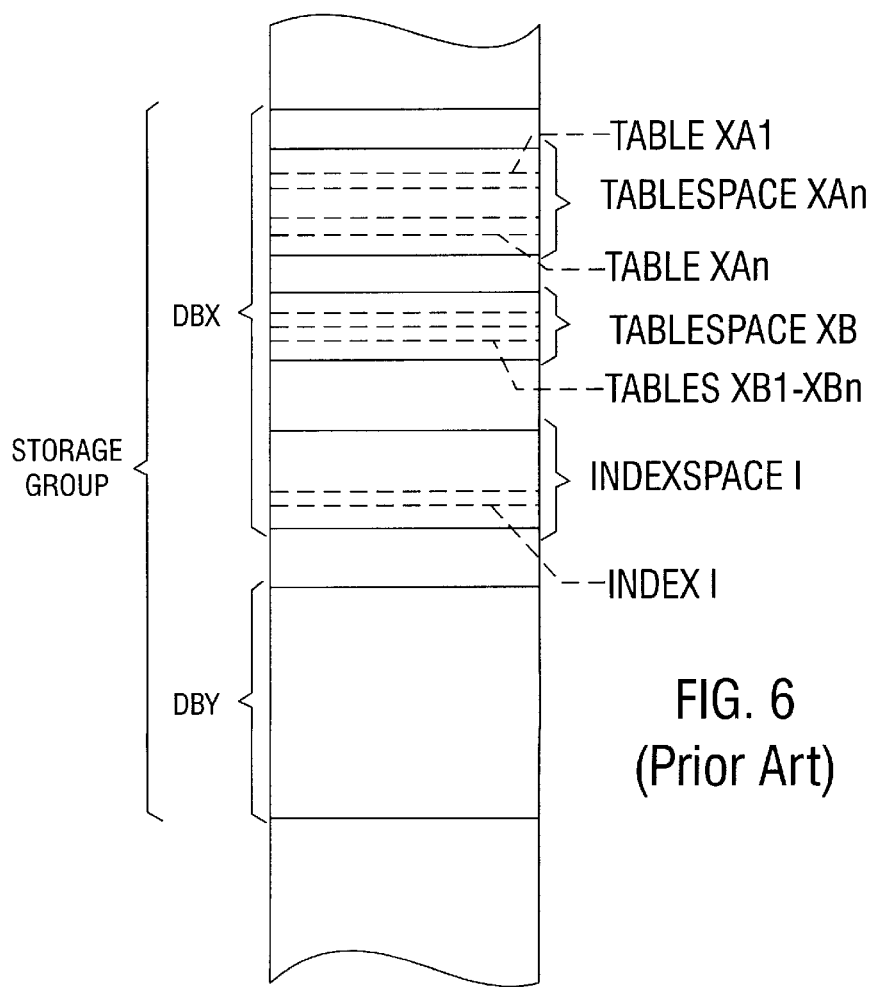
FIG. 6 is a map of data structures stored by a computer system having a DB2 database application therein.

The actual physical storage in any large DBMS implementation is necessarily partitioned in some way due to the system configuration, memory size, page size, construction of secondary storage, etc. In DB2, the database is a collection of logically related objects, i.e., the physically-stored tables and indexes. The terminology used in DB2 to describe the partitioned areas of storage includes terms such as "storage group," "tablespace," "indexspace," "bufferpool," etc. Tablespace refers to the part of secondary storage where tables are stored and indexspace refers to the part where indexes are stored. A page is the unit used in data transfer between primary storage or memory 37 and secondary storage or disk 38, and a "space" is a dynamically-extendable collection of pages. Referring to FIG. 6, the secondary storage of the computer system of FIG. 4 may contain, in one example, a user database called DBX (that is, the data 20 for a created database having the name DBX) and another called DBY. Within a database is defined one or more tablespaces, such as the tablespace XA and tablespace XB seen in the Figure. Within each tablespace are the data areas for stored tables (one or more), shown as tables XA1–XAn and XB1–XBn. A storage group is a collection of direct-access storage areas from the same device type (e.g., a disk 38); there is no one-to-one correspondence between a database such as DBX and a storage group, so in FIG. 6 it is seen that the same storage group contains all of database DBX and part of DBY. Views do no occupy corresponding storage, and can be defined over multiple tables from different databases, so no storage area in FIG. 6 is allocated to views. Bufferpool is a term referring to main memory 37 area reserved to satisfy the buffering requirements for one or more tables or indexes.

In DB2, the GRANT and REVOKE statements in SQL determine specific operations granted to or revoked from a user, and are in several categories, such as table and view privileges applying to existing tables, database privileges applying to creating tables, storage privileges dealing with the use of storage objects such as tablespaces and storage groups, and system privileges applying to operations such as creating a new database. There are certain bundled privileges specific to DB2, referring to assortments of privileges. These include the system administrator or SYSADM privilege which is the highest-order privilege and includes all possible operations within the system. A database administrator DBADM privilege on a specific database allows the holder to execute any operation on that database. A database control DBACTRL privilege on a specific database is similar to DBADM except that only control operation and no data manipulation as in SQL are allowed. The database maintenance DBMAINT privilege is a subset of the DBACTRL privilege and allows the holder to execute read-only maintenance operation such as back-up on the database. The system operator privilege allows the holder to perform only console operator functions with no access to the database. The design and development phases discussed to above with reference to FIG. 5 thus require SYSADM privilege level as it is necessary to make changes to all of the tables of FIG. 3.

Altering A Database Catalog Using Standard SQL

There are statements in the DDL part of SQL that allow certain alterations to be made in a database definition as it is specified in the catalog 21, after the tables, indexes, views and other objects of the database have been initially defined. These are statements such as ALTER TABLE, ALTER INDEX and DROP (TABLE, VIEW, etc.). For example, a statement:

```
ALTER TABLE EMPLOYEES
ADD ZIPCODE datatype
``` would cause a column named ZIPCODE to be added as the last column of the Employees table of FIG. 1, using a datatype as specified. This table will have the same owner and the same name as before. The detailed specifications for the ALTER TABLE statement and other statements for altering elements of a database using standard SQL/DDL are given in a pp. 100–121 of the publication "IBM Database 2 Version 2, SQL REFERENCE Release 2" available from IBM Corporation as item number SC26-4380, which is a part of the Library mentioned above.

Similarly, an ALTER INDEX statement in the existing SQL specification is available to make limited changes for an existing index. For example, the statement:

```
ALTER INDEX EMPLOYEE_NO
CLOSE YES
``` specifies that the data sets for the index are closed when the number of processes using the index becomes zero.

The syntax diagrams used in SQL statement definitions have been described in publications such as SQL REFERENCE and elsewhere in the literature (and in Appendix A). The syntax diagrams are read from left to right and top to bottom following the path of the lines. The beginning is a double arrowhead on the left pointing to the right, and the end is a pair of arrowheads on the right pointing to one another. A single arrowhead on the right of a line indicates the statement is continued on the next line, and on the left indicates a statement is continued form the previous line. Required items appear on the horizontal line (the main path), and optional items appear below the main path. If two or more items may be chosen, they appear in a stack, and if one must be chosen then one item of the stack appears in the main path. An arrow returning to the left, above the main line, indicates an item that can be repeated separated by a space, while if the repeat arrow contains a comma the repeat items are separated by a comma. A repeat arrow above a stack indicates that more than one choice can be made from the stacked items, or a single choice repeated. Statements and keywords appear in uppercase and variables (user-supplied) appear in lowercase; a default parameter appears in boldface underscored. Sometimes a single variable represents a set of several parameters, in which case the variable parameter block (in lower-case boldface) is shown as a diagram following the end of the main path; the variable parameter block may be replaced by any of the interpretations of such a diagram.

The changes that may be made in a database definition using standard SQL/DDL statements such as ALTER TABLE are seen to be very limited. For example, there is no facility for changing the owner in any of the ALTER statements; the only way to change the owner is to create a new table or other object by the user who is to be the owner. And, there is no capability for anyone other than the creator/owner of a table to make changes in a table. Likewise, there is no facility for changing the name of a database, a table, an index or a view. A very important shortcoming is the inability to change columns in a table except to add a column; there is no facility for changing a column name or datatype, or moving a column to a particular place in a table, or changing the NULL/NOT NULL specification, for example. To make these types of changes, it has been the practice to drop a table and create a new table with the desired specification, and along with this it is necessary to generate a lengthy sequence of steps in a language other than DDL because the existing data for the previously-defined table must be preserved and transferred to the new table.

For example, to change the length of a column, the actual steps generated by the BMC ALTER program mentioned above, using DDL (without the CDL concepts of the invention) would include:

```
UNLOAD data from data 20, change length in unloaded data
DROP table
CREATE TABLE
LABEL ON table columns
GRANT authorizations on table
CREATE SYNONYMS
CREATE INDEXes
CREATE VIEWs that use table
CREATE VIEWs that use views
LABEL ON view columns
GRANT authorizations to views
LOAD data
RUNSTATS on table spaces and indexes
IMAGECOPY table space
Precompile, compile, link applications programs
BIND application plans
```

Of these steps, the DROP, CREATE, LABEL ON, and GRANT statements are DDL statements, but the other steps are coded by other languages.

Thus, the BMC DB2 ALTER product mentioned above operates by using SQL/DDL in combination with non-DDL code to change the data structure and the definition of the data structure of a database. In the example above, a column width may be changed by using data accessing steps to save the data, a DDL DROP statement to cancel a table containing the column, then rebuilding the table with a different-sized column using CREATE, and then reloading the saved data into the new data structure.

Due to these limitations in the change or alter operations permitted by standard SQL/DDL, it has been inefficient to use SQL alone as the language for making changes in all phases during the design, development, test and production phases of a database application. Particularly, the constraints on the standard SQL language have made changes to the catalog 21, particularly the tables of FIG. 3, awkward and unreliable for the early phases of the cycle, especially when migration of the changes to downstream phases, and feedback to earlier phases, is needed.

Similarly, the BMC ALTER product mentioned above, while it greatly expands the facility for making changes in an maintaining a database application, still requires all changes to be individually entered by a programmer at a terminal, interactively, and does not account for the situation where the local instance of the catalog has been changed so it is different from that in an earlier instance.

Change Definition Language

According to one embodiment of the invention, interpreter apparatus for a change definition language (CDL) is provided in the form of program instructions for a preexisting programmable processor, so that a user can write statements to make changes in an existing database to accommodate a wide variety of commonly-needed alterations in almost all objects of the catalog or definition of the database. This change definition language is defined by the specification of the permitted statements set forth in Appendix A.

The details of one implementation of the change definition language of this embodiment are described in Appendix B, which is a BNF grammer definition with Action C routines, used as an input into a LEX/YACC parser tool commercially available from MKS (Mortice Kern Systems); parsing a group of CDL statements and transforming them into machine-executable form is a matter of routine for those of ordinary skill having the benefit of this disclosure.

The change definition language of this embodiment is written in a style very similar to SQL, so that a programmer skilled in using SQL, particularly the DDL part of SQL, will be able to use CDL with a minimum of instruction. The full SQL facility 23 is needed, for CDL to operate, i.e., SQL/DDL must be present for reference when interpreting, analyzing and executing a set of CDL-defined changes, or must be present if a change statement is entered interactively. The statements of the change definition language are indeed implemented using the underlying SQL/DDL statements and code.

Referring to the statements of the embodiment of the change definition language of Appendix A, an ALTER TABLE statement is available which is greatly expanded in capability, compared to that of the standard SQL as set forth in the SQL REFERENCE publication. For example, to change the Address column in the Employees table of FIG. 1 to allow a more lengthy address to be recorded, and to change the name of this column to Home_Address, a statement would be used as follows:

```
ALTER TABLE Accnt1.EMPLOYEES
   ALTER COLUMN ADDRESS new_datatype
   ALTER COLUMN ADDRESS NAME HOME_ADDRESS
```

To add a column named Zipcode to the Employees table, positioned after the Address column (instead of at the end), the following statement would be used:

```
ALTER TABLE Accnt1.EMPLOYEES
   ADD COLUMN ZIPCODE AFTER ADDRESS datatype
```

To move the Employee_No column to the beginning, so it is the first column, the following statement is used:

```
ALTER TABLE Accnt1.EMPLOYEES
   ALTER COLUMN ADDRESS MOVE BEFORE LNAME
```

The owner of a table is changed from user "Accnt1" to user "Accnt2" by an ALTER TABLE statement as follows:

```
ALTER TABLE Accnt1.EMPLOYEES
   OWNER Accnt2
```

The capabilities of the ALTER INDEX statement of Appendix A is also greatly expanded compared to that of standard SQL. The owner of an index is changed from user "Accnt1" to user "Accnt2" by an ALTER INDEX statement as follows:

```
ALTER INDEX Accnt1.EMPLOYEE_NO
   OWNER Accnt2
```

An index can be changed from unique to not unique or vice versa; for example, an index of the SSNs from the SSN column of the Employees table of FIG. 1 is made unique by a statement:

```
ALTER INDEX Accnt1.SSN_INDEX
   UNIQUE YES
```

The name of the Employee_No index of FIG. 1 is changed to Empl_Number by the statement:

```
ALTER INDEX Accnt1.EMPLOYEE_NO
   NAME EMPL_NUMBER
```

The ALTER VIEW statement of Appendix A finds no counterpart in the standard SQL/DDL specification. A user may change the owner or name of a view, add a column, change a column name (to agree with a changed table), drop a column from the view, etc. For example, to change the name of the view PROJECT_WEEK of FIG. 1 to WEEK, and to add the employee number column from the Employees table and drop the employee's first name column FNAME, the following statement is used:

```
ALTER VIEW Acct1.PROJECT_WEEK
   NAME WEEK
   DROP COLUMN FNAME
   AS SELECT EMPLOYEE_NO
      FROM EMPLOYEES
```

Another capability of the change definition language of Appendix A, as compared to the Alter statements in standard SQL/DDL, is that of defining the ownership of a database, a table, an index or a view, as being a user other than the current user. The CREATE DATABASE, CREATE TABLE and CREATE VIEW statements of Appendix A all have an alternative of changing the owner to one other than the issuer of the statement.

Figure 7:
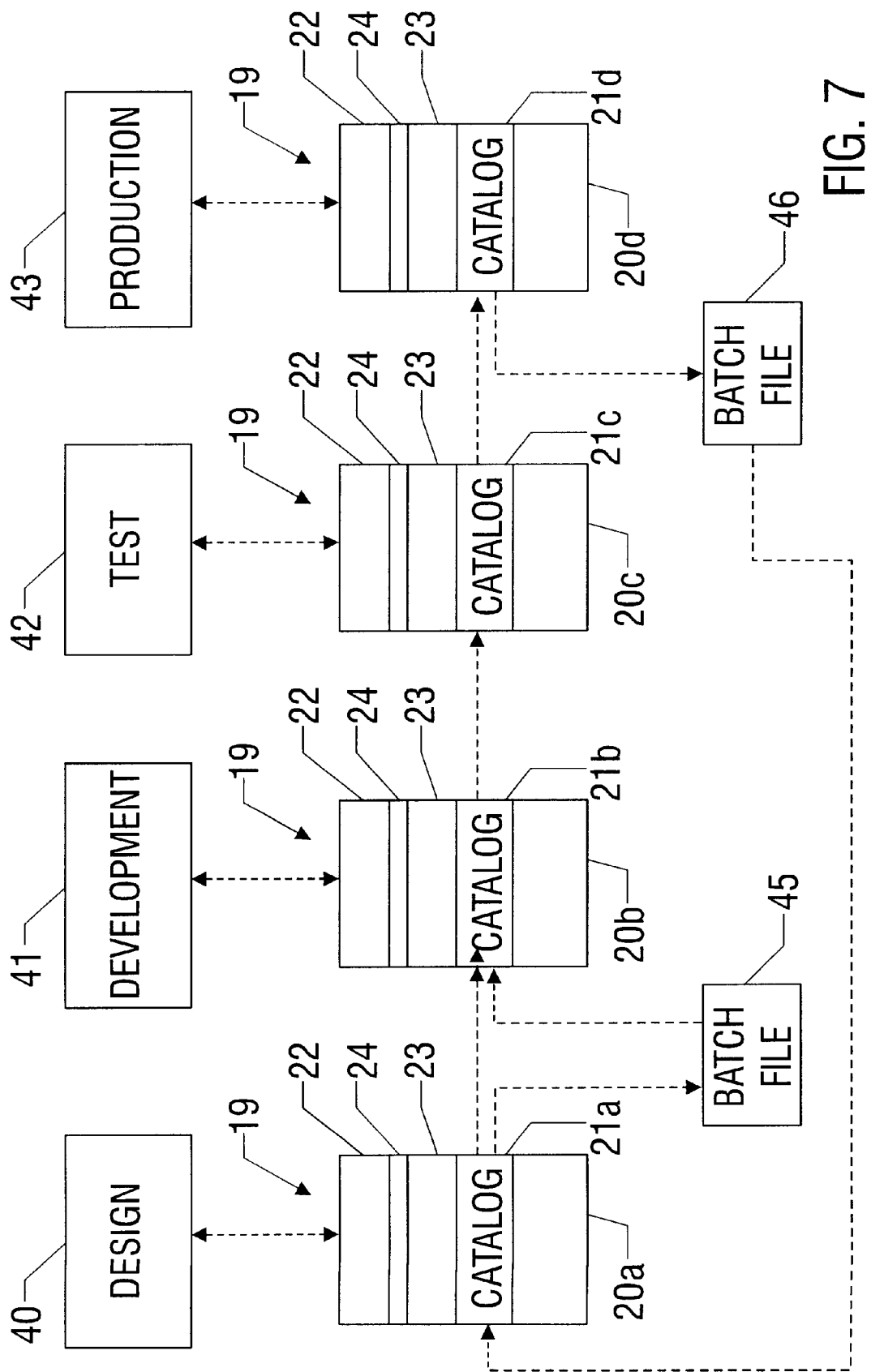
FIG. 7 is a diagram like FIG. 5 of phases in a database application, showing migrating forward and feed back of batches of change statements made in a change definition language according to one embodiment of the invention.

By using the statements of the change definition language, in any of the phases of FIG. 5, the catalog 21 can be changed to describe the altered database by making changes to the tables of FIG. 3. Referring to FIG. 7, one way of implementing the migration and feedback is to create in one phase a batch file 45 consisting of all of the changes (expressed in change definition language) made since the original design catalog 21a was passed to the development phase. This batch file of CDL statements is executed on the catalog 21b, which itself has been changed by the development people, so it is not the same as catalog 21a. Thus, there may be inconsistencies. A characteristic of a program for executing the changes defined by the CDL of the invention is that when a change is attempted using an ALTER TABLE statement, for example, and an inconsistency is found (e.g., the column name has been locally changed), the ALTER statement will not execute but instead an error will be signalled and the changes can be reconciled by direct coding (e.g., the columns names changed to be consistent). Similarly, a batch file 46 of all of the changes made by the production phase (since the catalog 21c was received from the test phase) may be created and fed back to the design team, and this batch of statements executed on the latest catalog version 21a. Again, any inconsistencies will not execute and can be reconciled.

Figure 8:
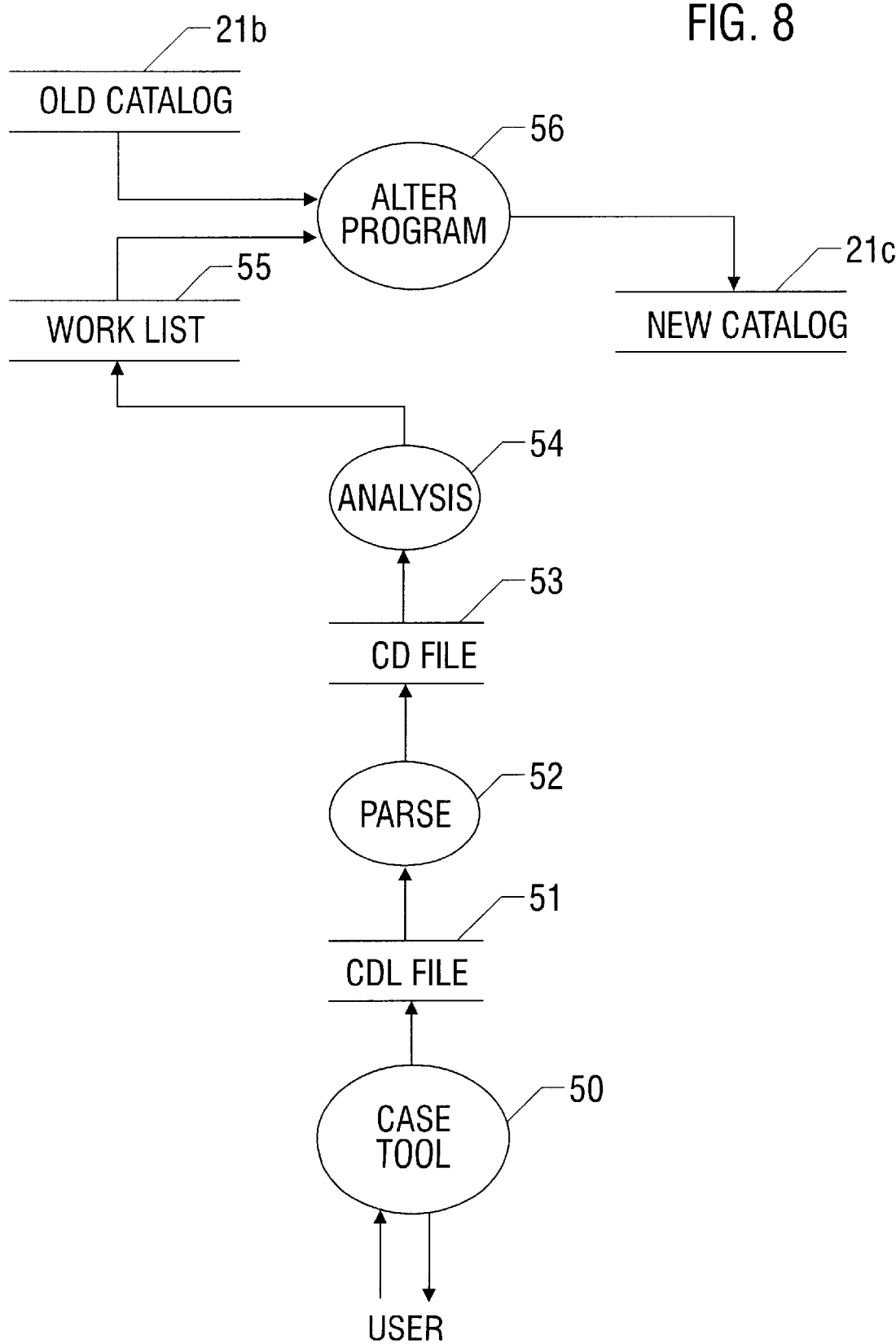
FIG. 8 is a diagram representing the steps in a method of generating changes in a database catalog using the change definition language of the invention.

Referring to FIG. 8, it is noted that one typical way of using the CDL according to an embodiment of the invention is for the user to interact with a CASE tool 50 or other facility such as the BMC DB2 ALTER program which is commercially available, to generate a file 51 of statements in CDL. That is, the user does not write the series of CDL statements describing the changes he wishes to make in the existing database catalog, but instead the user inputs information into a computer-aided generator 50 which interprets the user input and writes the statements of the CDL file 51. The CASE tool or DB2 ALTER program 50 may be the same tool used by a designer in defining the data structure of a database, and is merely for the convenience of the user, since the CDL file 51 could also be created directly by the user. The CDL file 51 is processed by a parser 52 to import the CDL statements to change definition tables, storing them in a file 53, into DB2 format (i.e., expanding the CDL statements into complete SQL-compatible sequences needed to effect the desired changes). The file 53 is processed by an analyzer 54 which generates a worklist 55 of changes which take into account dependencies and the like, and reconcile differences in names, etc., so that an executable worklist is provided. The old catalog 21b (for example) is then processed by the ALTER program 56 to generate the new catalog 21c.

Figure 9:
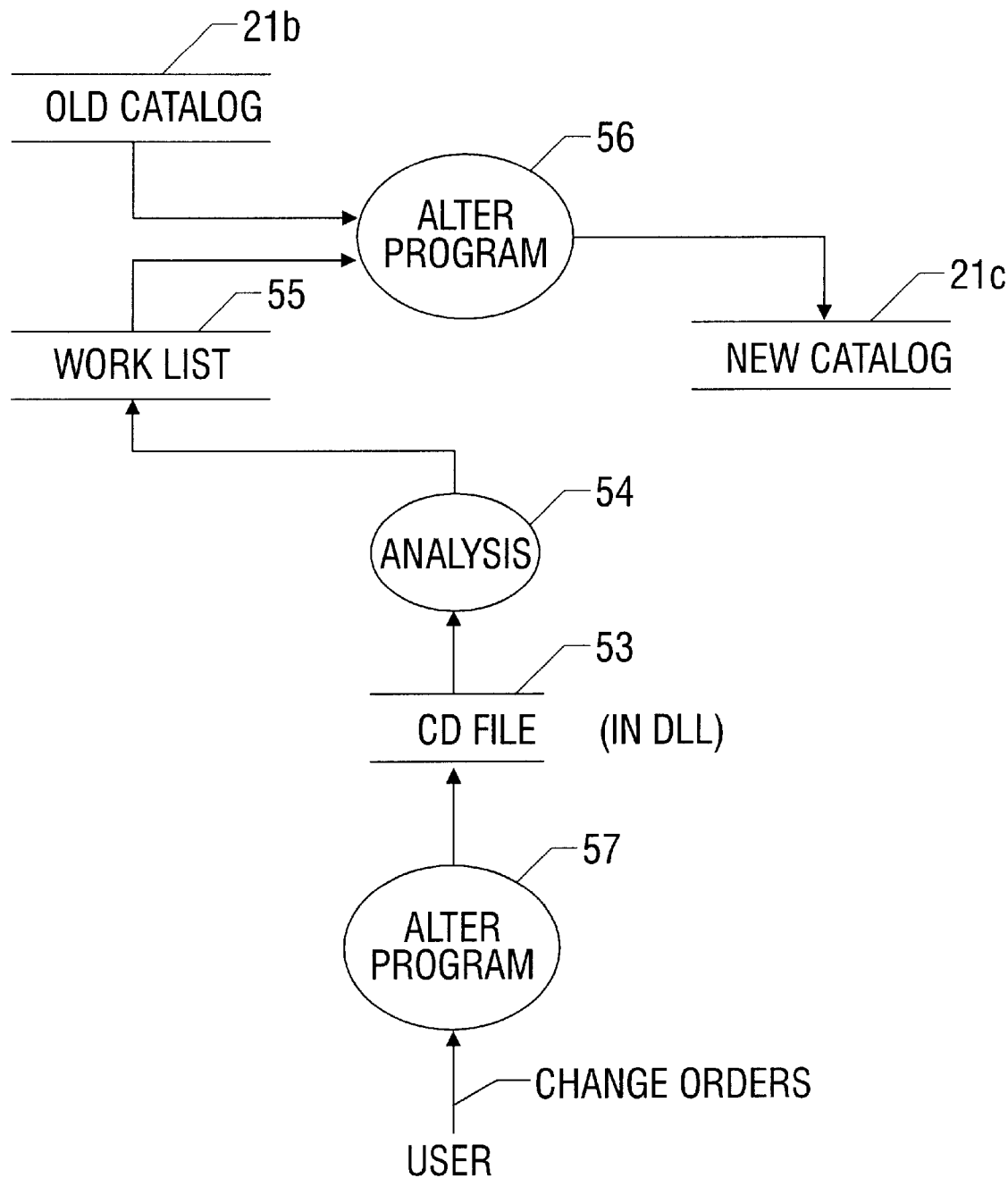
FIG. 9 is a diagram representing the steps in a method of generating changes in a database catalog using the methods of the prior art.

Referring to FIG. 9, the same change operation as in FIG. 8 is illustrated using prior art methods and facilities. It is seen that the processes 54 and 56 are prior art functions used in the previous methods as well as in conjunction with the CDL of the invention as represented in FIG. 8. In the prior art method of FIG. 9, however, the user interacted using the ALTER specification 57 (the user writing change orders) to generate the change definition tables stored in the CD file 53. The difference between the method of FIG. 8 and that of FIG. 9 is that in the method according to this embodiment of the invention as seen in FIG. 8 the user generates the change statements of file 51 (via the CASE tool 50 if desired) in a CDL language, which is subsequently translated into the change definition in SQL/DDL form.

Figure 10:
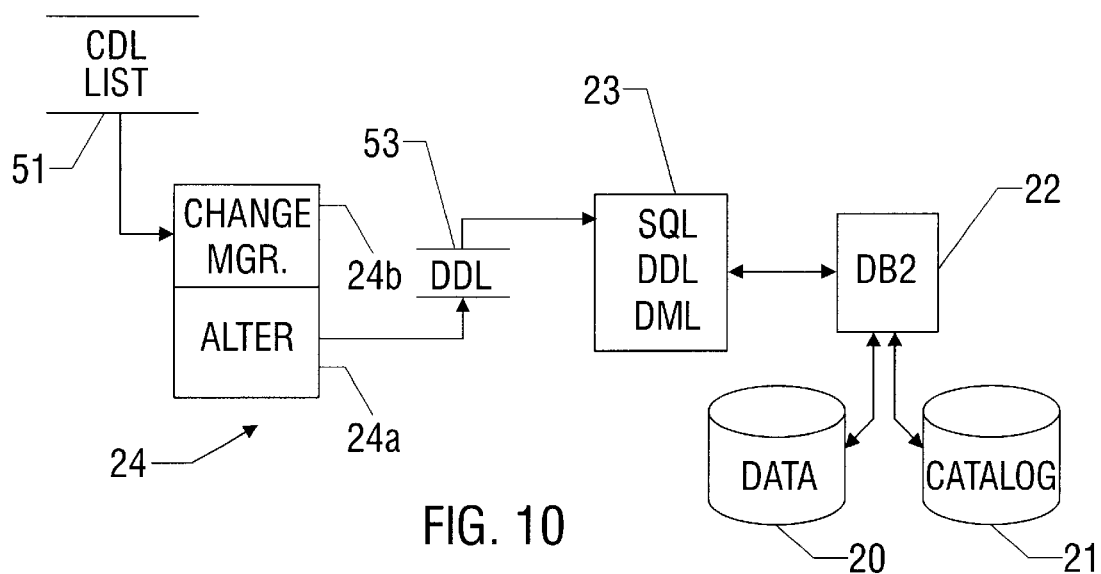
FIGS. 10 and 11 are a diagram of a method of implementing changes in a database system using the CDL of the invention.

Referring to FIG. 10, the operation of a change method using the CDL according to the invention, is illustrated. The database software 22 is maintaining a catalog 21 for a database have data store 20. Access to the database is via SQL 23 which includes DDL and DML. The change mechanism 24 includes the commercially-available BMC DB2 ALTER program 24a, which provides an interface for defining changes in the manner of FIG. 9. That is, an interactive user interface 57 provided by ALTER program 24 allows a user to enter changes, for example, by merely typing over a column name or datatype in a structured display of the table on a screen for a given table in the database previously defined. The ALTER program 24a generates first a description of the change expressed in DDL, and this is a series of statements as discussed above (UNLOAD, DROP, etc.), and stored in the CD file 53 of FIGS. 8 and 9.

In addition to the facilities provided by the ALTER program 24a, the change mechanism 24 includes a change manager 24b which has the ability to accept a change definition (CDL file 51 of FIG. 8) expressed in CDL. This is in addition to the other facilities of ALTER program 24a, rather than in place of. The change manager 24b parses the CDL file 51 and thus generates the change file 53 of FIGS. 8 or 9. Note that the changes described in CDL in the file 51 are of the same types as could be generated by hand using the interface 57 for the ALTER program 24a. The difference is, the CDL file 51 is machine readable, as well as being of generally SQL format and readable by a programmer familiar with SQL with little additional training.

The source of the CDL list 51 could be a user who hand-codes the file, but more likely it is generated by machine. For example, in a preferred embodiment, the CDL file 51 is generated by the facilities seen in FIG. 11, where another copy of the database software 22 is maintaining another instance of the catalog 21, referred to here as 21a. This instance of FIG. 11 could be the design phase 40 referred to above, for example. The access and definition mechanism or SQL 23 is present, and another instance of the change mechanism 24, including BMC ALTER and change manager. Changes could be made in the catalog 21a by a user engaging ALTER in an interactive mode as discussed above, or by entering change statements in CDL, or by use of a CASE tool 59 such as Bachman. After a series of changes have been made in the catalog 21a, the CDL file 51 is generated by the change manager 24b.

Figure 11:
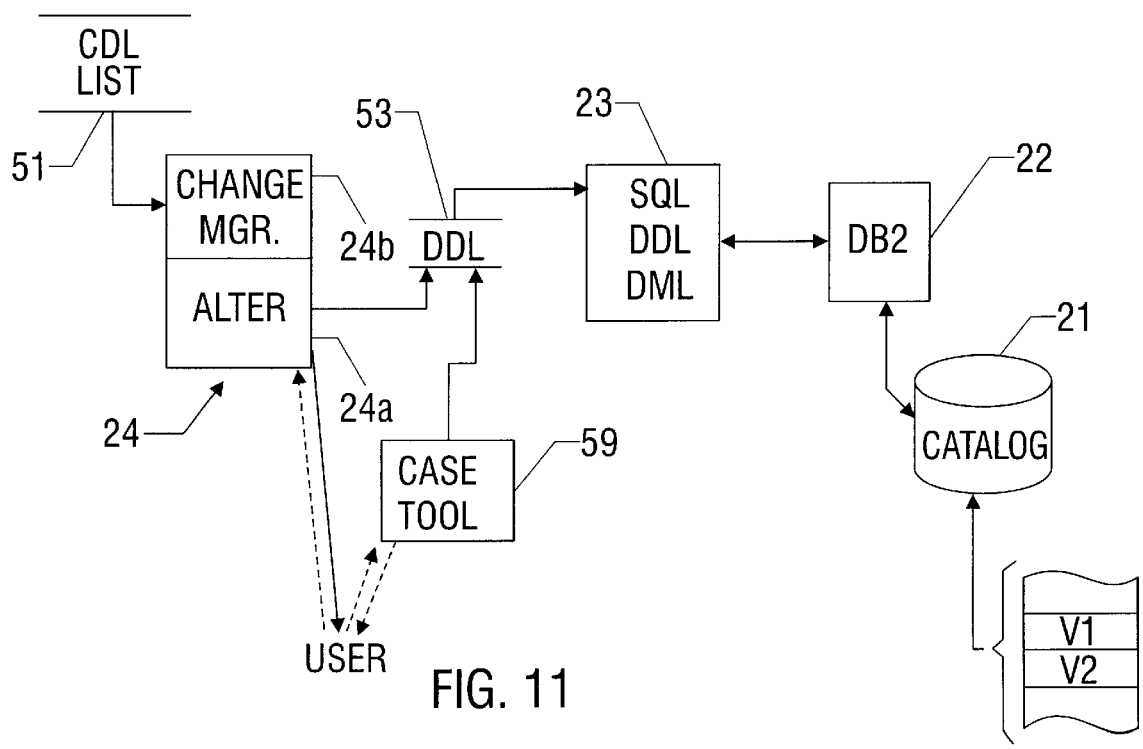

An important feature of the method as depicted in FIGS. 10 and 11 is communicating the changes in a very precise set of statements as permitted by CDL, rather than the drop and rebuild type of definitions permitted by DDL. That is, DDL describes a change in terms of how the resultant structure is supposed to be rebuilt, rather than how an existing structure is to be changed. If a column is to be changed in a table, DDL statements to accomplish this will include a CREATE TABLE statement naming every column in the table, whereas a CDL statement names only the changed column. Further, the CDL file 51 is a list of changes to a specified instance of the catalog 21. So, before generating the changes by the mechanism of FIG. 11, the first step is to make a copy of the existing instance of the catalog (before this set of changes is made), and to this end a copy V1 of catalog 21 is made, then after the series of changes are implemented locally, another instance V2 is available. When the CDL file 51 is generated to be sent to a downstream change manager, the way this is done is to compare version V1 with version V2 and generate change statements to define the differences; this could be done by maintaining a journal of the changes made and replaying it, but since there can be changes to changed parts, and items may be changed and then reinstated to their original form, it is more precise to generate the CDL file 51 by comparing V1 and V2.

Figure 12:
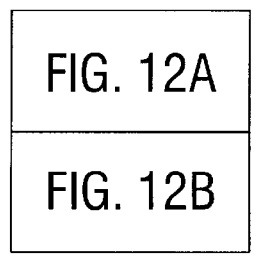
FIG. 12 is a logic flow chart of a simplified method implemented in the change manager of FIG. 11.
Figure 12A:
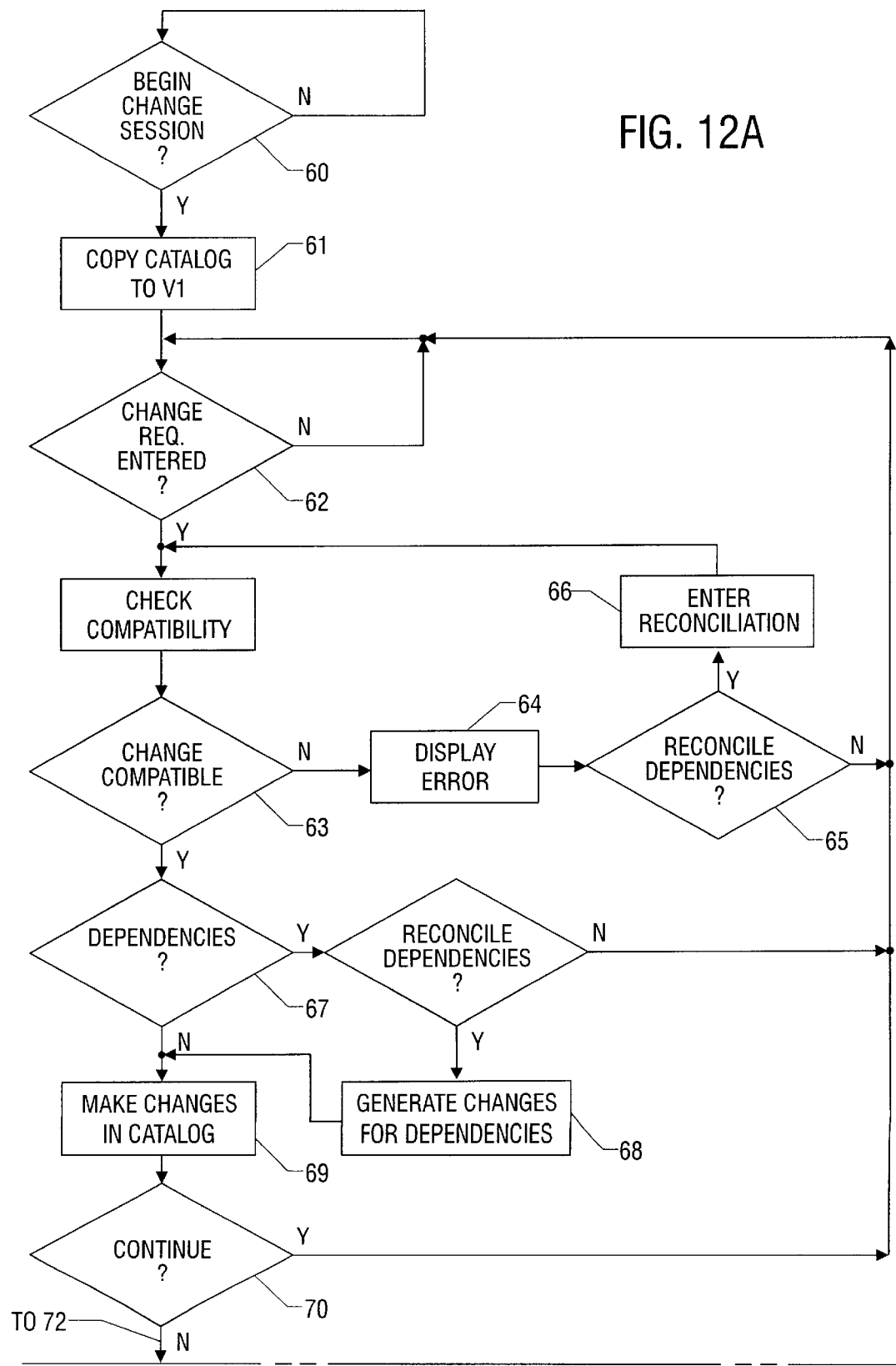
Figure 12B:
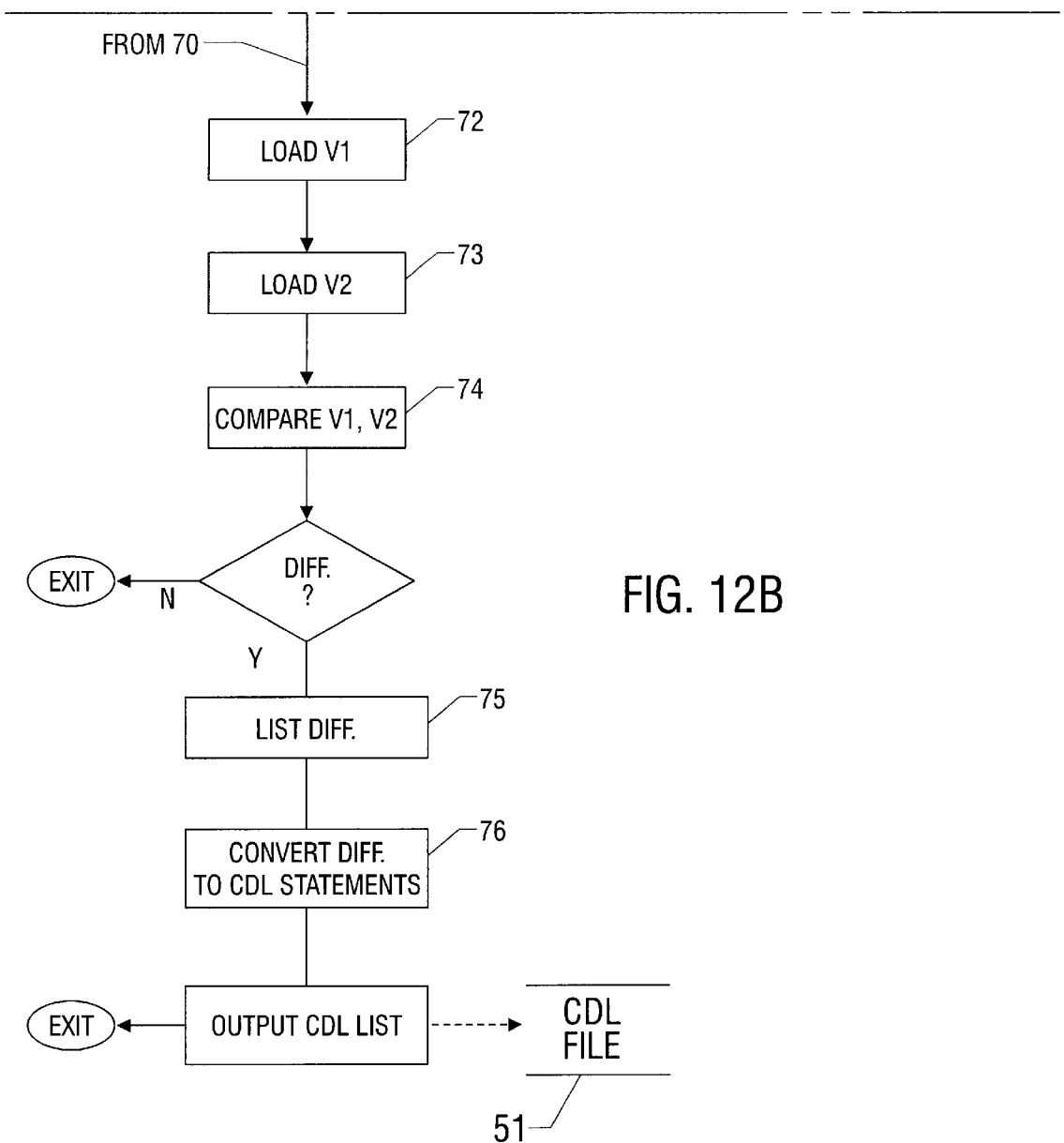

Referring to FIG. 12, this operation of generating the CDL file 51 as performed by the change manager module 24b of FIG. 11 is illustrated in flow chart form. A loop depicted by block 60 indicates waiting for a change session to begin. When entering a change session, the first step indicated by block 61 is to copy the existing catalog 21 to storage, so a reference is available when later the CDL file 51 is to be generated. The copy is referred to as version-1 or V1. Next a loop 62 is entered where the system waits for the user to enter a change, e.g., interactively at a terminal using BMC ALTER or using the CASE tool 59, and when a change is entered it is checked for compatibility at block 63, i.e., there is a check to see if a table exists by that name, a column by that name, etc. If not compatible, an error is displayed at block 64 and the user is given the alternative of reconciling the difference, at block 65. If not, control returns to loop 62, or, if so, the reconciliation is entered at 66. The compatible change is then checked at 67 for dependencies (a column being changed used in other tables, indexes or views, etc.), and these are reconciled at block 68. After, consistencies and dependencies are all checked and defined, the requested change is implemented at block 69, i.e., the catalog V2 is altered to implement the requested change and its associated necessary changes. The session can continue if needed, at decision point 70, so additional changes are entered as long as the user wishes. When continue point 70 indicates "no," the output CDL file 51 is generated as seen in FIG. 12B by first loading V1 and V2, blocks 72 and 73, and comparing the two, block 74. If they are different, a list of the differences is generated at block 75, and this list is converted to CDL language at block 76, as by a parser, and sent out as the CDL file 51.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method of altering an existing data structure in a database system, said existing data structure including a plurality of related tables of columns and rows of data values and further including one or more indexes for said related tables to provide a relational database, said existing data structure being defined by a catalog data structure including tables of tables and indexes, said method comprising the steps of:

a) receiving a change indication signal,
   1) said change indication signal encoding one or more statements conforming to a change definition language that is a superset of a SQL structured query language,
   2) said change definition language including a plurality of available statements for changing at least one of A) a data specification of a column, B) an owner of a table or an index, and C) a name of a column or an index,
   3) said one or more statements specifying one or more requested changes to be made in the existing data structure;

b) testing whether said one or more requested changes can be made in the existing data structure; and c) if said changes can be made in said existing data structure, then making said changes, or else signaling an error.

2. A method executed by a computer system of making changes in a data description catalog of a DB2 database implemented on said computer system, comprising the steps of:

a) receiving a list of change statements describing said changes, said change statements being selected from a library of change statements in the format of a change description language constituting a superset of an SQL structured query language, including statements for changing, in said data description catalog:
   a data specification of a column,
   the owner of a table, an index or a view,
   the name of a column, an index or a view;

b) generating from said list a set of changes to said data description catalog, said set of changes being in an SQL data description language for said database; and c) invoking execution of an SQL routine to read and execute said set of changes.

* * * * *